(No Model.)
J. N. HICKS.
CAR TRUCK.
No. 299,786. Patented June 3, 1884.
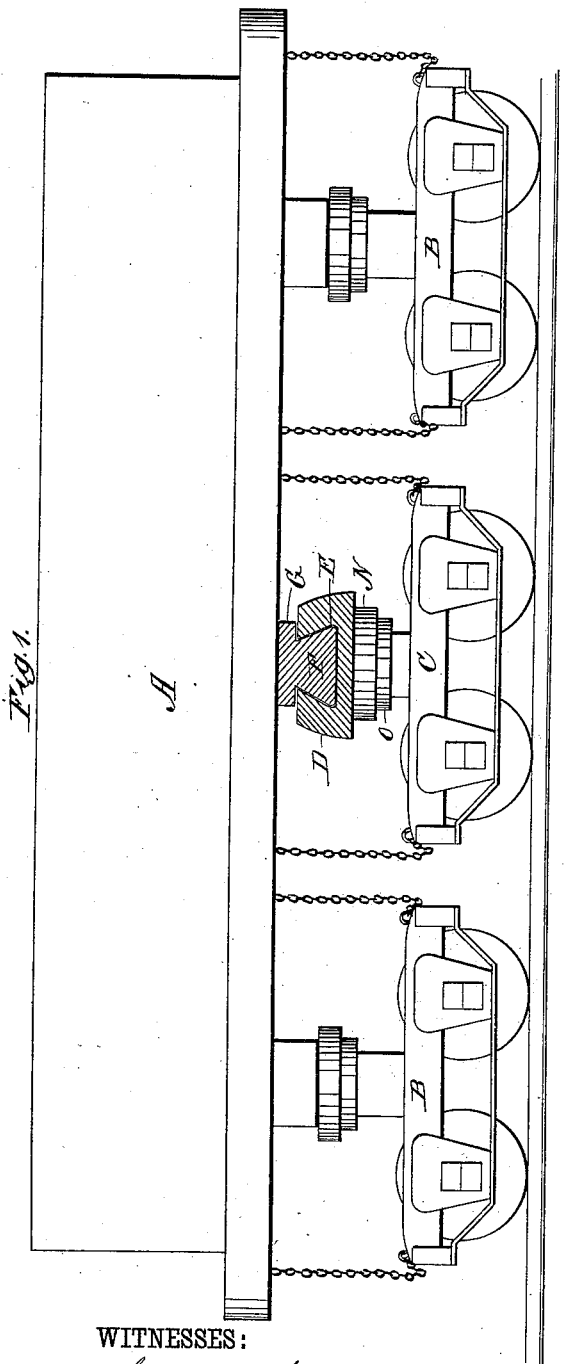
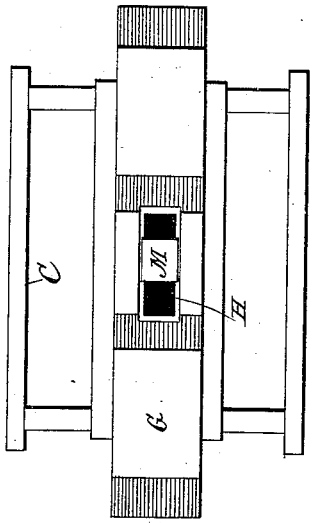
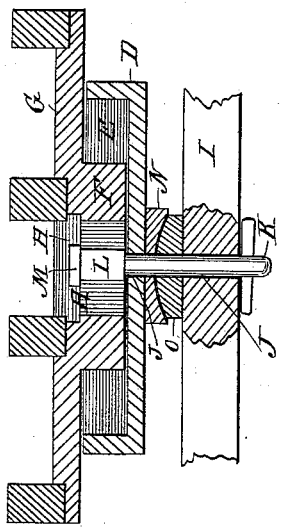
WITNESSES:
W. W. Hollingsworth
A. G. Lyne
INVENTOR:
James N. Hicks
BY Munn & Co.
ATTORNEYS.

UNITED STATES PATENT OFFICE.

JAMES NELSON HICKS, OF MARYSVILLE, PENNSYLVANIA, ASSIGNOR OF ONE-HALF TO DANIEL H. FISHER, OF SAME PLACE.

CAR-TRUCK.

SPECIFICATION forming part of Letters Patent No. 299,786, dated June 3, 1884.

Application filed February 20, 1884. (No model.)

*To all whom it may concern:*

Be it known that I, JAMES NELSON HICKS, of Marysville, in the county of Perry and State of Pennsylvania, have invented a new and useful Improvement in Bolsters for Railway-Cars, of which the following is a full, clear, and exact description, reference being had to the annexed drawings, forming part of this specification.

My invention relates to sliding bolsters for intermediate trucks on railway-cars; and the invention consists of the novel construction hereinafter described and claimed.

In the drawings, Figure 1 is a side elevation of a railway-car, showing my invention partly in section. Fig. 2 is a cross-section of the car, showing my improved bolster in longitudinal section; and Fig. 3 is a partial plan view showing my invention.

A indicates a railway-car supported on two end trucks, B B, in the usual manner, and having a third intermediate truck, C, near its center. Such intermediate trucks have been used before, and they have been adapted to have a lateral sliding movement independent of the car, to enable them to accommodate themselves to curves in the track without additional friction between the wheels and the rails. Various expedients have been employed for connecting such an intermediate truck with a car, such as a longitudinally-slotted bolster and a king-bolt on which the bolster slides, and in other cases the truck has been connected rigidly to the car by a laterally-sliding joint formed by guides on the car, in which the bolster slides.

It is important that the intermediate truck shall be adapted to have to a certain extent a horizontally-oscillating movement, while the bolster forms a rigid sliding joint with the car; and to secure this object in what seems to be the most practical way I provide the bolster D with a dovetail or equivalent groove, E, in which a corresponding rib, F, on the car is fitted, and form in the rib F and the car-beam G a longitudinal slot, H, and in the bolster D and body I of the truck a perforation, J, for the king-bolt K. The king-bolt K is formed with a square portion, L, at its upper end, which prevents it from turning in the rib, and a square head, M, somewhat thicker than the portion L, which fits in the slot in the beam G. The king-bolt is thus firmly supported in the car, while it has a sliding lateral motion therein, and it is connected to the truck only by the perforation J, which allows the truck to oscillate horizontally.

Between the bolster D and the body I of the truck are arranged the concave and convex disks or washers N O, which operate in the usual manner.

What I claim is—

The combination of the intermediate truck having a perforation, J, in the bolster and body, the car having a longitudinal slot, H, in the beam G and means for forming a sliding joint with the bolster, and the king-bolt K, having squared portion L, adapted to fit in the slot H, substantially as shown and described.

JAMES NELSON ✕ HICKS.
his   mark.

Witnesses:
 PAUL CHARLTON,
 D. H. FISHER.